Patented Oct. 22, 1940

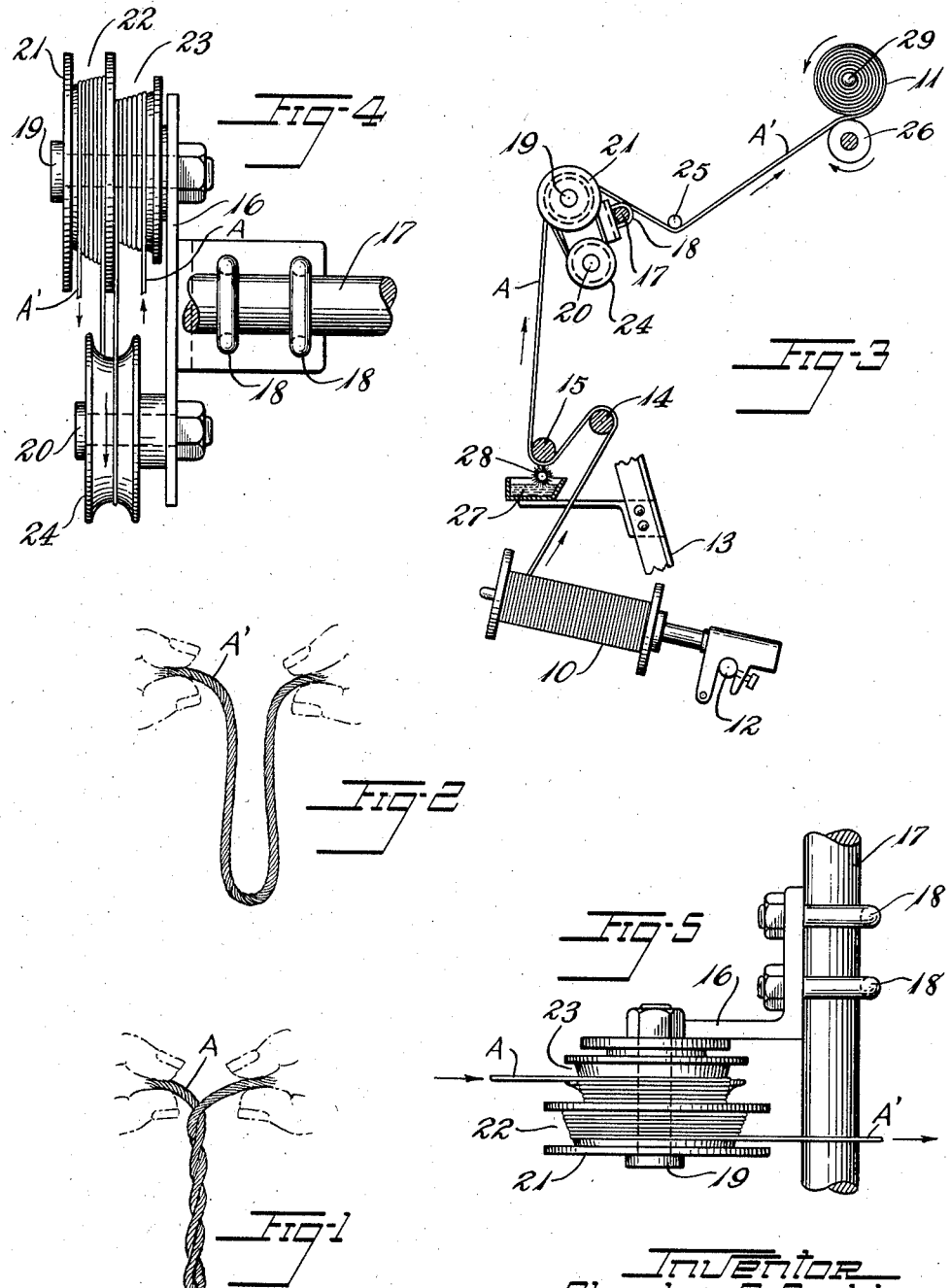

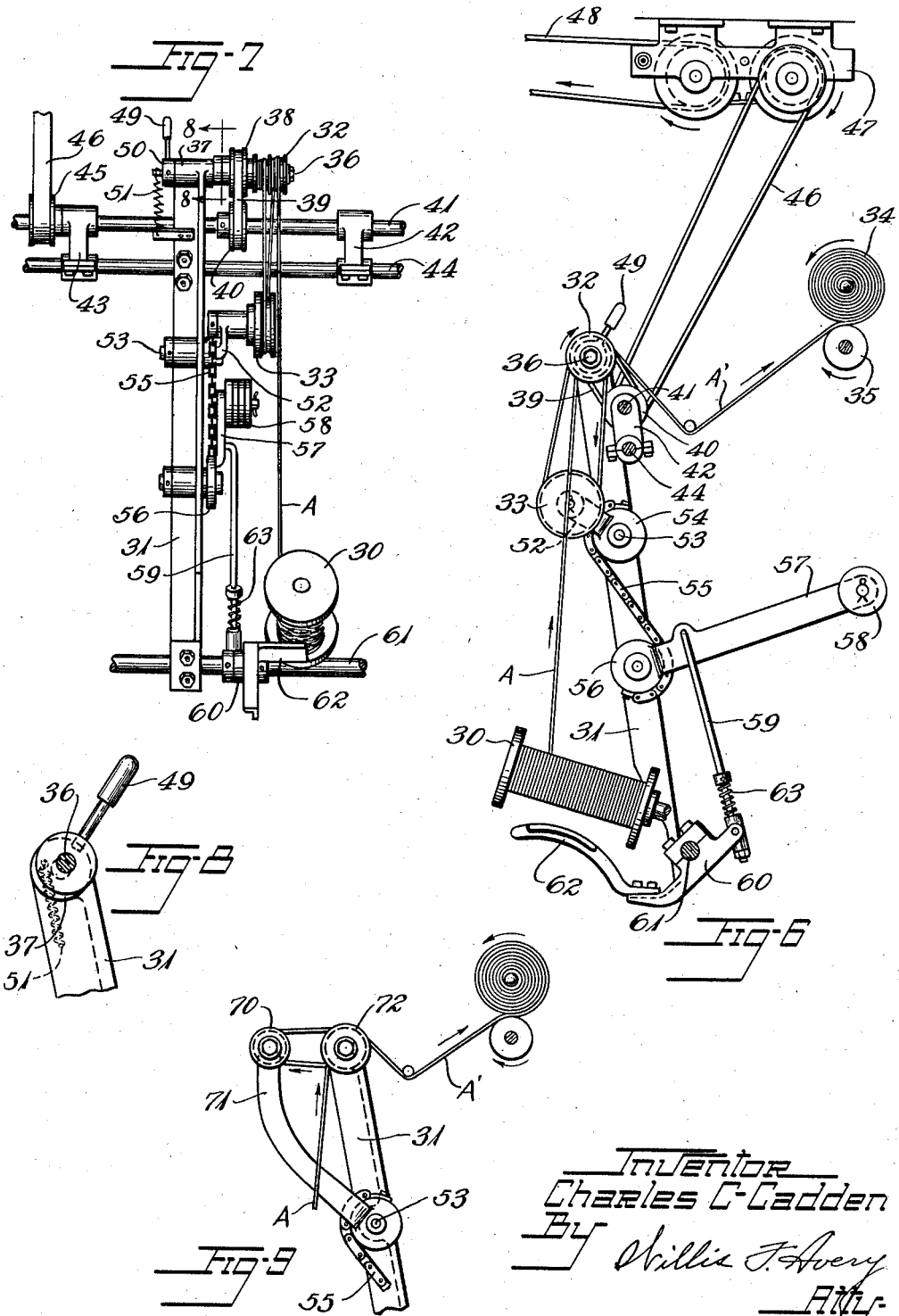

2,218,504

UNITED STATES PATENT OFFICE 2,218,504

APPARATUS FOR PREPARING CORD FOR MAKING ARTICLES SUCH AS PNEUMATIC TIRES, BELTS, AND THE LIKE

Charles C. Cadden, Akron, Ohio, assignor to The B. F. Goodrich Company, New York, N. Y., a corporation of New York Original application February 24, 1937, Serial No. 127,355. Divided and this application May 17, 1939, Serial No. 274,146

12 Claims. (Cl. 28—57)

This invention relates to the making of articles such as pneumatic tires, belts and the like, and especially to the preparation of cord for such articles. This application is a division of my copending application Serial No. 127,355, filed February 24, 1937.

It is desirable, among other things, that cord for making such articles be balanced when in the relaxed state so that it will not kink or curl upon itself so as to be difficult to position it accurately in the desired disposition in the article. The balanced condition of the cord is desirable especially when the cords are formed into a weftless or weak-wefted or woven fabric for incorporation into the article, where kinking or curling of the cord, such as to disturb the desired alignment of the cords in the fabric and curling or warping of the fabric, is objectionable.

Heretofore, the balanced condition of the cord has been obtained to a more or less approximate degree by so controlling the amount and direction of the twist of the yarns, the plies and the cord that the twists will counteract each other to provide the balanced condition in the cord as it comes from the final twister. Such cord, however, has had the objectionable characteristic of becoming unbalanced when appreciably stretched, during handling or otherwise, apparently as a result of a change in the relationships of the twists caused by relative slippage of the fibers within the cord.

Among other things, in addition to the balanced condition of the cord, it is desirable that the cord when built into the article have good elasticity, that is, ability to return substantially to its original length on being relieved of elongating forces. This desirable characteristic of good elasticity is not obtained when the cord is such that elongating forces will cause a considerable slippage of the individual fibers of the cord with relation to one another so that under an elongating force a permanent set of the cord takes place.

Among the chief objects of the present invention are to provide a cord that is balanced in its relaxed state before incorporation into the article and at the same time has a high degree of elasticity, or in other words, has a low fiber slippage, when subsequently elongated, and to provide such a cord by procedure and instrumentalities that make possible the production of the cord conveniently and with uniform quality. I have discovered that the desired characteristics can be imparted to the cord in an effective and convenient manner after the cord has been finally twisted and before the cord is incorporated in the article, and even before it is made into a fabric.

A further and related object is to provide a cord that has a high resistance to the effect of cyclic stresses in the article, such for example, as the compressing, tensioning and flexing stresses resulting from the rapid flexure of the side walls of a pneumatic tire, or the rapid-flexure stresses of a belt traveling around pulleys, as distinguished from the mere static stresses on the cords of the article under load. The useful life of the cords is dependent to a very large degree upon their ability to withstand the cyclic stresses without excessive heating from rubbing fibers in the cord, and the tensile strength, alone, of the cords is not so important as their ability to resist the cyclic stresses in the manner of useful life of such articles as pneumatic tires and belts which are subjected to severe cyclic stresses.

A still further object is to provide a high degree of uniformity of elongation of the cords in the article so that when the cords are disposed in layers, the cords of each layer and the cords of the several layers will not take greatly unequal portions of the load, but will be stressed with substantial uniformity.

These and further objects will be apparent from the following description reference being had to the accompanying drawings in which:

Fig. 1 is an elevation of a loop of unbalanced cord in a relaxed condition showing the curling or twisting of the loop upon itself resulting from the unbalanced condition.

Fig. 2 is a view like Fig. 1, but showing a balanced cord.

Fig. 3 is an elevation, with parts broken away and sectioned, of rewinding and stretching mechanism constructed according to and embodying the invention.

Fig. 4 is an elevation of a part of the cord-stretching mechanism of Fig. 3.

Fig. 5 is a view of the cord-stretching mechanism of Figs. 3 and 4, as seen from above.

Fig. 6 is an elevation like Fig. 3 but showing a modified form of apparatus constructed according to and embodying the invention.

Fig. 7 is an elevation of the apparatus of Fig. 6 as seen from the side of Fig. 6.

Fig. 8 is a section taken along the line 8—8 of Fig. 7.

Fig. 9 is a fragmentary elevation of a further modified form of stretching and rewinding apparatus constructed according to and embodying the invention.

In general, the objects of the invention are attained in the preferred manner by producing cord in any suitable twisting mechanism, the cord being so twisted that it is unbalanced as determined by the curling of it upon itself when a loop of it is suspended in a relaxed state as shown in Fig. 1; and then subjecting the cord to a working treatment, preferably a stretching operation, to such a degree that the cord becomes balanced, as determined by a lack of curling of the loop, as shown in Fig. 2. The loops of Figs. 1 and 2 may be effected simply by grasping the cord with each hand at two spaced apart positions and moving the hands toward each other to cause the loop to be suspended freely between the two grasped positions. The loop of unbalanced cord curls upon itself as shown in Fig. 1, whereas the loop of balanced cord remains uncurled, as show in Fig. 2, even when the sides of the loop are brought close together. This simple and effective test for balance can be made at any position along a cord of great or short length.

I prefer to have the unbalanced condition of the cord as it comes from the twister produced by over-twisting, that is, the final or cord twist is more than sufficient to counteract the effects of the yarn and ply twists of the cord, and so causes the cord to be unbalanced. When this cord is then stretched to obtain the balanced condition, a cord that is highly compact, elastic and resistant to the effects of cyclic stresses results. The invention, however, is not limited to this manner of twisting the cord, as the initial unbalanced condition may be obtained by an over-twisting of any one or two of the three twists, yarn, ply and cord, with relation to the third.

I have found that balanced cords prepared according to the invention remain balanced even after being subjected to subsequent stretching under the ordinary small forces of handling, and this is advantageous especially where the cord is to be subjected to some stretching during handling and during the operations of forming it into fabric and applying rubber to it. Apparently the change in the cord from the unbalanced to the balanced condition results from a readjustment or slippage of the fibers of the cord relative to one another during the stretching operation and this readjustment of the fibers has also the effect of rendering the cord thereafter more elastic. The improved cord, moreover, has a high resistance to breakdown from the effects of cyclic or vibrating stresses, cord prepared according to the invention having shown life duration over twice as great as cord not so prepared when subjected to tests to determine the life of the cord under a vibrating force.

In the drawings, the cord in its unbalanced condition as it is taken from the final twister is indicated A, and the cord after the operation of stretching or working to give it the improved characteristics is indicated A'.

The improved characteristics of the cord may be obtained conveniently and expeditiously by subjecting the cord to the stretching operation as it is rewound from the spool or bobbin, on which it is taken from the twisting mechanism, onto a cone for handling and transporting it preparatory to forming the cord into fabric, for incorporation into the article. According to the preferred manner of carrying out the invention, the unbalanced cord leaving the spool is so worked during the rewinding that it becomes balanced and has the other desirable characteristics discussed when it is wound onto the cone.

Referring to the embodiment of Figs. 3 to 5 the cord A is removed from a spool 10 and is passed through mechanism for stretching the cord, and the stretched cord A' is then rewound into a cone 11. The spool is mounted upon a supporting rod 12 of a suitable suporting frame, a portion of which is shown at 13, and the spool is preferably retarded frictionally in any suitable manner to avoid undesirable slackness of the cord. The cord A is passed over a pair of idler rollers 14 and 15, and then through a suitable stretching mechanism. The stretching mechanism illustrated comprises a supporting bracket 16 suitably mounted upon a supporting rod 17 of the frame, as by clamps 18, 18 and upon a bracket 16 are mounted a pair of spaced apart stud axles 19 and 20. Upon the axle 19 is mounted for free rotation a pulley 21 having a pair of grooves 22 and 23 preferably tapered as shown, the groove 23 being of lesser diameter than the groove 22. The pulley 21 may be an integral, double-grooved unit, but preferably it comprises two pulleys bolted or clamped together or otherwise detachably united for rotation together so that changes in the diameters of the two grooves with relation to each other may be conveniently effected. The cord A is passed around the pulley several times, first in the groove 23 of lesser diameter, thence around an idler pulley 24, the latter being mounted for free rotation upon a stud axle 20, and then for several turns around the pulley 21 in its groove 22 of larger diameter. From there the cord is drawn onto the cone 11, an element 25 being provided with connections to a suitable mechanism (not shown) for stopping the operation in the event of cord-breakage, if desired. The cone 11 is mounted upon a spindle 29 for rotation and may be rotated for the rewinding in any suitable manner as by means of contacting driven roller 26 so that the cord is drawn through the stretching mechanism with sufficient tension to impart an elongation to it resulting from the increase in peripheral speed of the groove 22 over the peripheral speed of the groove 23 of the pulley 21.

While I have not found it to be essential, the cord may if desired be moistened prior to the stretching operation in any suitable manner as by means of a bath of water 27 having a freely rotating brush 28 contacting the cord to apply the water to it.

Referring to the embodiment of Figs. 6 to 8 the stretching pulley may be power driven, in which case the tension on the cord at the cone winder need be sufficient only to effect the winding of the cone. In this embodiment a spool 30 of the unbalanced cord A is suitably mounted upon a frame support, an element of which is shown at 31, and the cord A is led directly to the groove of lesser diameter of a double grooved pulley 32. After passing around the groove of smaller diameter several turns, the cord passes around an idler pulley 33 and then back to the pulley 32 where it passes for several turns around in the groove of larger diameter. From there the cord is wound onto a cone 34, which may be rotated for the rewinding by any suitable mechanism, such as a contacting driven roller 35 effective to rotate the cone. In this embodiment the double-grooved pulley 32 is journaled for free rotation upon a shaft 36 which is supported in a suitable bearing 37 on the frame. The pulley 32 is driven by means of a pulley 38 connected by a driving belt 39 to a pulley 40 on a driving shaft 41. The pulleys 38 and 32 are interconnected for rotation together on the shaft 36. The driving shaft 41 may be rotatably supported in bearings in brackets 42, 43 mounted upon a supporting rod 44 of the frame. Power for driving the shaft 41 may be supplied as by means of a pulley 45 having a belt 46 connected to any suitable speed-reduction gear 47, the drive for which may be supplied by a belt 48 from a source of power.

For conveniently disconnecting the drive to the stretching pulley 32, as when it is desired to apply a cord, the portion of the shaft 36 carrying the pulleys 32 and 38 is constructed in eccentric relation with the portion of the shaft within the bearing 37 of the frame and a handle 49, secured to a collar 50, is mounted at the end of the shaft for manually rotating it to move the pulley 38 into and out of driving engagement with the belt 39. A spring 51 normally urges the shaft in a direction to effect the driving engagement.

Mechanism is provided for maintaining substantially uniform tension on the cord A as it is drawn from the spool 30 onto the double-grooved pulley 32 so that the uniformity of elongation imparted to the cord will not be lessened undesirably by slackness in portions of the cord A as it comes from the spool 30. To this end the idler pulley 33 of the stretching mechanism is mounted for rotation upon an arm 52 which is pivotally supported at 53 upon a frame element 31. Integral with the arm 52 is a roller 54 to the surface of which is attached the end of a chain 55. The other end of the chain passes partly about the surface of a similar roller 56 also mounted for rotation upon the frame element 31. The roller 56 is integral with the arm 57 having at its outer end a weight 58 and at an intermediate portion of the arm a link 59 which is pivotally connected at its lower end to a lever 60 mounted for pivotal movement on a supporting rod 61. An arcuately faced brake member 62 is mounted upon a lever 60 and is adapted to be moved into and out of contact with the cord on the spool 30. For cushioning the braking action the link 59 may have a spring connection 63 arranged so that downward movement of the link 59 will cause the brake element 62 to be urged against the support resiliently. The arrangement is such that so long as there is normal tension in the cord A as it is drawn from the spool 30 the brake 62 will remain out of contact with the spool but when a relatively slack portion of the cord passes into the stretching mechanism the idler pulley 33 will be caused to drop somewhat, resulting in the application of the brake 62 by means of the interconnecting chain 55, the arm 57, link 59 and lever 60. When the cord A again resumes its normal tension the idler pulley 33 will rise, effecting a reverse movement of the brake mechanism and releasing the brake from the spool.

Referring to the embodiment of Fig. 9, for conveniently effecting a shorter reach of the stretched cord between the double-grooved pulley and the idler pulley, the idler pulley 70 may be mounted upon an arm 71 reaching up into close proximity to the double grooved pulley 72. In this embodiment I prefer that the stretched reach of the cord be provided by a spacing of the axes of the pulleys 70 and 72 of about four inches. The remaining mechanism may be the same as that of Figs. 6 to 8.

In the operation of the several embodiments, the spool of unbalanced cord A, as it comes from the final twister, is mounted as described and is threaded through the stretching pulleys and onto the cone, or is spliced onto the end of a cord already threaded through the mechanism, and as the cord is drawn through the mechanism it is stretched to impart to it the improved characteristics herein described, and it is then rewound onto the cone where it is ready for handling and forming into fabric.

The invention is applicable to cords of various constructions, sizes, degrees of twist, etc. By means of the simple test of Figs. 1 and 2 the condition of balance or unbalance of the cord can be determined readily, and for a cord of particular size, construction, twist condition, etc., the amount of stretch to be given the cord to change it from an unbalanced condition to a balanced condition can be arrived at with convenience simply by increasing the amount of stretch, as by applying successive stretching pulleys of increasing ratio of the diameters of the two grooves, until the amount of stretch is sufficient to change the unbalanced cord to a balanced cord.

Illustrative of the advantages of the invention, but not limiting the invention to cord of any particular character, are the following principal properties of a cord of the 22s–5–3 construction, $1\tfrac{5}{32}''$ staple cotton, showing improved changes in the cord as a result of preparing it in accordance with the invention, the amount of stretch imparted to the cord by the stretching pulleys in this particular case being that given by an increase of about 18% in the diameter of the larger groove as compared with the diameter of the smaller groove of the double-grooved stretching pulley.

|  | Cord A (before stretching) | Cord A' (after stretching) |
|---|---|---|
| Balance | Unbalanced | Balanced |
| Gauge (diameter in inches) | .0345 | .0314 |
| Ply twist (turns per inch) | 24.37 | 23.58 |
| Hawser twist (turns per inch) | 11.93 | 11.02 |
| Specific gravity | .939 | 1.107 |

Cord so prepared has shown an improved length of life more than doubled under the severe vibrating tests hereinbefore described, and the cord, originally unbalanced, is made balanced by the stretching preparation and it remains balanced even when subsequently restretched repeatedly under the ordinary small forces of handling. Also, the final cord has a high degree of ability to return to its original length when relaxed after subsequent elongation of it, and the compactness of the cord is increased by the preparation, as is evident from the reduction in gauge, and degrees of twist and from the increase in the specific gravity of the cord as a result of the stretching operation. The greater compactness of the cord is indicative of its greater ability to resist slippage of the fibers upon one another in the cord, which apparently accounts for the improved ability to withstand cyclic stresses, the fibers in the compact cord being flexed together with but little, if any, sliding friction such as would promote breakdown, by wear and development of heat, when the cord is flexed rapidly and alternately compressed and tensioned longitudinally in such use as in the side wall of a pneumatic tire.

The specific gravity referred to herein is the specific gravity of the material of the cord, including a 6½% (by weight) moisture regain and the air within the internal spaces, which would occupy the volumetric space within an enclosing coating of rubber calendered upon the cord. Whereas cords produced heretofore have been of a comparatively low specific gravity, under .90, and therefore comparatively soft and subject to considerable fiber slippage in use, cord prepared according to the present invention has a relatively high specific gravity, .90 and over for most cords, and is accordingly harder, or more compact, and has greater ability to resist fiber slippage when stressed, with the related advantages hereinbefore discussed.

As the improved results are obtainable in cords of various constructions, degrees of twist, gauges, etc., and cotton or other fibers of various staple lengths, variations may be made without departing from the scope of the invention as it is hereinafter claimed.

I claim:

1. Apparatus for preparing cord for use in making pneumatic tires, belts and the like, said apparatus comprising means for supplying completely twisted, unbalanced cord, means including free-running pulley surfaces of increasing peripheral speeds for stretching the cord an amount such as to impart to the cord a substantially balanced condition, and means for winding the cord.

2. Apparatus for preparing cord for use in making pneumatic tires, belts and the like, said apparatus comprising means or supplying cord, means for progressively stretching the cord, and means controlled by the cord itself for retarding the rate of supply upon a slackening of the cord.

3. Apparatus for preparing cord for use in making pneumatic tires, belts and the like, said apparatus comprising means for supplying cord, means for progressively stretching the cord including means for retaining a stretched reach of the cord in loop form, and means controlled by the length of the loop for retarding the rate of supply upon a slackening of the cord.

4. Apparatus for preparing cord comprising means for stretching a reach of the cord and means for supplying the cord at a variable rate dependent upon the tension in the stretched reach thereof.

5. In a cord stretching apparatus, cord let-off mechanism, cord take-up mechanism, driving means for the take-up mechanism, and a pair of free running rollers interposed between the mechanisms and at least one roller of the pair having a plurality of annular grooves arranged in stepped relation and about which the cord passes so as to stretch the cord as it advances from a small to a large diameter groove during its passage about said rollers from the let-off mechanism to the take-up mechanism.

6. Apparatus for preparing cord for use in making pneumatic tires, belts and the like, said apparatus comprising means for supplying cord, means for progressively stretching the cord, and means for coordinating the stretching means and the rate of supply of the cord for producing substantially uniformly stretched cord despite variations in the stretchability of the supplied cord.

7. Apparatus as defined in claim 6 in which the said coordinating means frictionally engages the cord as it is supplied.

8. Apparatus for preparing cord for use in making pneumatic tires, belts and the like, said apparatus comprising means for supplying cord, a pair of stretching rollers over which the cord is looped for stretching, said rollers being movable one with relation to the other to vary the length of the loop, and means coordinating the position of the movable roller and the rate of supply of the cord for producing substantially uniformly stretched cord despite variations in the stretchability of the supplied cord.

9. Apparatus for preparing cord for use in making pneumatic tires, belts and the like, said apparatus comprising means for supplying cord, means for progressively stretching the cord comprising a free-running roller having stepped surfaces of increasing diameter and a second free-running roller over which rollers the cord is looped to stretch the cord as it passes between said surfaces, and means for drawing the cord from said free-running rollers.

10. Apparatus for preparing cord for use in making pneumatic tires, belts and the like, said apparatus comprising means for supplying cord, means for stretching the cord comprising a roller having stepped surfaces of increasing diameter and a second roller over which rollers the cord is looped to stretch the cord as it passes between said surfaces, one of said rollers being movable with relation to the other to vary the length of the loop, and means for urging the movable roller away from the other roller.

11. Apparatus for preparing cord for use in making pneumatic tires, belts and the like, said apparatus comprising means for supplying cord, means for stretching the cord comprising a free-running roller having stepped surfaces of increasing diameter and a second free-running roller over which rollers the cord is looped to stretch the cord as it passes between said surfaces, and means for drawing the cord from the free-running rollers, one of said rollers being movable with relation to the other to vary the length of the loop and means for urging the movable roller away from the other roller.

12. Apparatus for preparing cord for use in making pneumatic tires, belts and the like, said apparatus comprising means for supplying cord, means for stretching the cord comprising a free-running roller having stepped surfaces of increasing diameter and a second free-running roller over which rollers the cord is looped to stretch the cord as it passes between said surfaces, and means for drawing the cord from the free-running rollers, one of said rollers being movable with relation to the other to vary the length of the loop, means for urging the movable roller away from the other roller, and means for coordinating the position of the movable roller with the rate of supply of the cord for producing substantially uniformly stretched cord despite variations in the stretchability of the supplied cord.

CHARLES C. CADDEN.